United States Patent [19]

Bloome et al.

[11] Patent Number: 4,546,927
[45] Date of Patent: Oct. 15, 1985

[54] MEAT SEPARATING MEANS

[75] Inventors: James A. Bloome, Blue Grass; Jimmie Shaw, Davenport, both of Iowa

[73] Assignee: The Kartridg Pak Co., Davenport, Iowa

[21] Appl. No.: 595,429

[22] Filed: Mar. 30, 1984

[51] Int. Cl.⁴ .............................................. B02C 23/16
[52] U.S. Cl. .................................... 241/74; 241/260.1
[58] Field of Search ............ 241/102, DIG. 30, 260.1, 241/74, 166, 167

[56] References Cited

U.S. PATENT DOCUMENTS

| | | | |
|---|---|---|---|
| 136,002 | 2/1873 | Olds | 241/DIG. 30 |
| 1,676,306 | 7/1928 | White | 241/DIG. 30 |
| 4,042,176 | 8/1977 | Beck et al. | 241/74 X |

Primary Examiner—Mark Rosenbaum

Attorney, Agent, or Firm—Lockwood, Alex, FitzGibbon & Cummings

[57] ABSTRACT

An improved machine for separating meat from meat feed material having a substantial content of sinews or sinew-like material and being essentially free of bone particles larger than bone slivers, and wherein such a meat feed material is fed into one end of a foraminous cylinder in which an auger rotates at relatively high speed and fluidized meat separated from sinews, sinew-like material and bone slivers extrudes through the foramina while sinews, sinew-like material and bone slivers when present exit through a restricted discharge orifice, the improvement residing in a strip of flexible non-abrasive material being mounted on the crest of the auger flite so as to engage the interior of the foraminous cylinder and cut, and thereby free sinews or the like that may be lodged or trapped in the foramina.

7 Claims, 8 Drawing Figures

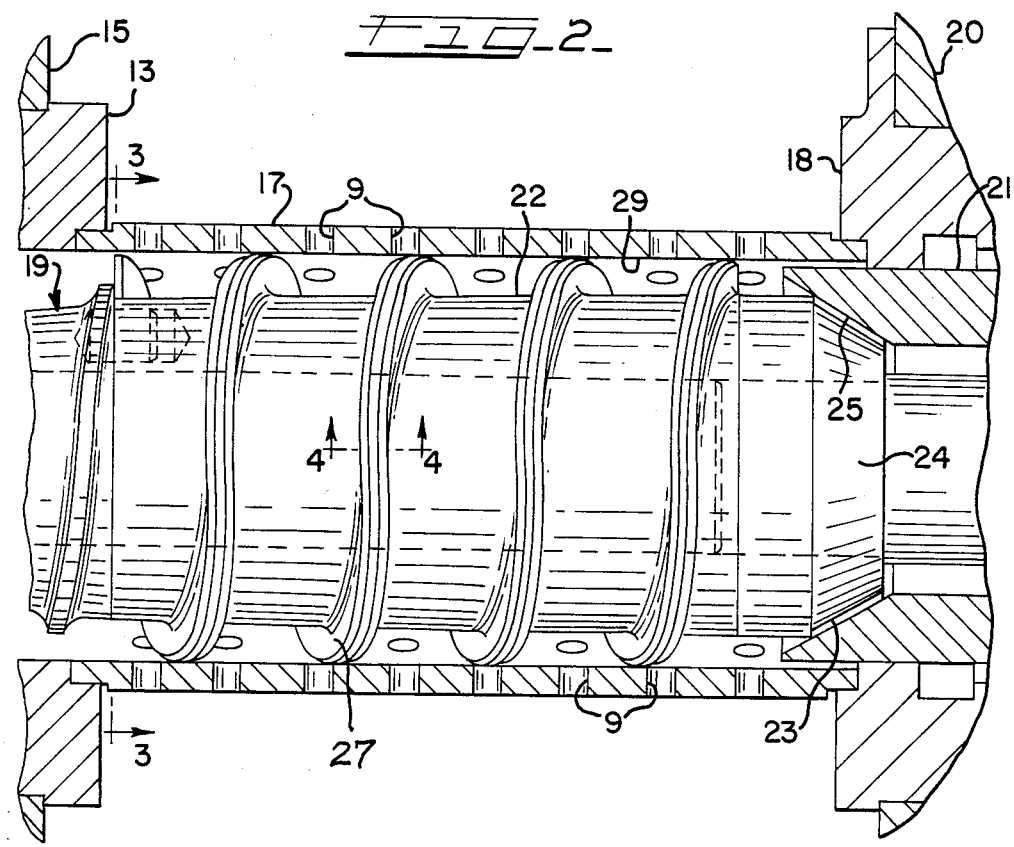
FIG_2_
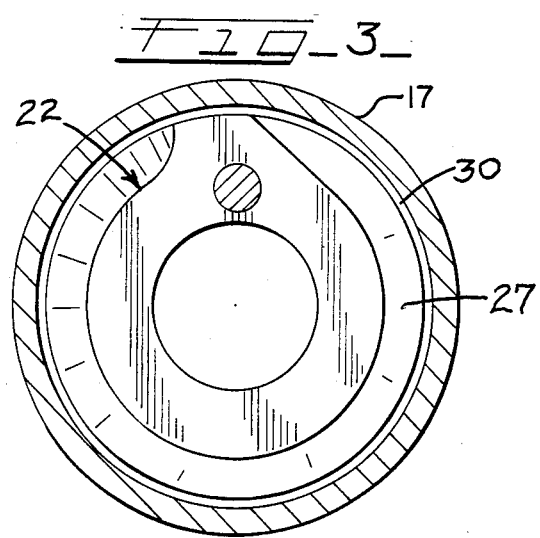
FIG_3_
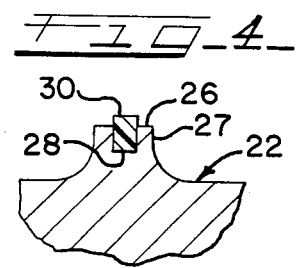
FIG_4_

MEAT SEPARATING MEANS

This invention relates generally to new and useful improvements in meat separating machines of the type wherein a conveying screw auger rotates rapidly within a foraminous screen or housing for separating meat from meat feed material having a substantial content of sinews or sinew-like material while being essentially free of bone particles or pieces larger than bone slivers. Meat separator machines of this general type are shown and described, for example, in U.S. Pat. No. 4,042,176 granted Aug. 16, 1977 to Nicholas Robert Beck, Gordon C. Leonard and Jack A. Prince and available commercially from The Kartridg Pak Co., Davenport, Iowa under the trademark "YIELDMASTER". However, such machines have heretofore been primarily used for separating meat (cooked or raw) from a meat material infeed containing a substantial content of bone pieces or particles substantially larger than bone slivers.

The meat deboning machine of U.S. Pat. No. 4,042,176 is characterized by having a perforated housing section comprising a rigid foraminous or perforated cylinder in which a conveying auger rotates at relatively high rotational speed in the order of 500 to 1800 rpm. According to the disclosure in U.S. Pat. No. 4,042,176, in normal operation a meat-bone mixture is fed into the infeed end of the foraminous cylinder from an adjoining pressurizing auger section of the machine. Separation of meat from bone solids is effected within the perforated housing section with the meat in liquid or fluidized condition extruding through the foramina or small orifices in the perforated cylinder while bone solids and sinews or sinew-like material (i.e. tendons, gristle, cartilage and connective tissue) leaving the discharge end of the perforated cylinder exit through a generally frusto-conical orifice. The size of the frusto-conical orifice is set or adjusted so that it is restricted and a back pressure is created on the meat-bone mixture within the perforated housing.

Due to the fact that the auger rotates at a relatively high speed within the perforated cylinder of a deboning machine as disclosed in U.S. Pat. No. 4,042,176, it has been found that there should be an appreciable clearance between the outer diameter (O.D.) of the flite on the auger and the interior diameter (I.D.) of the perforated housing or cylinder so that metal-to-metal contact with resulting damage is avoided.

Meat fibers formed from sinews, or sinew-like material in a meat-bone feed have a tendency to enter two or more adjacent screen perforations or foramina at the same time thereby wrapping between the perforations and tending to clog the screen. Since there is an appreciable clearance between the auger flite outer diameter and the screen or perforated cylinder inner diameter in order to avoid metal-to-metal contact, the auger flite cannot directly cut through such meat fibers that have become lodged in the perforations or foramina. However, during normal operation with an infeed material containing a substantial content of bone particles of appreciable size, the agitated bone particles scour the inner diameter of the screen or cylinder cutting the lodged meat fibers so that they do not clog the perforations or foramina to an objectionable extent. However, when a separator machine of the type disclosed in U.S. Pat. No. 4,042,176 is fed with a meat material infeed having a substantial content of sinews or sinew-like material while being essentially free of bone pieces or particles appreciably larger than bone slivers, then the normal scouring action of bone pieces or particles is not present and the meat fibers tend to quickly plug the perforations or foramina necessitating a shut-down for cleaning within a short period of time.

It has been discovered in accordance with the present invention that a rotary meat separator machine of the type disclosed in U.S. Pat. No. 4,042,176 can be adapted and made useful for separating meat from meat infeed material having a substantial content of sinews or sinew-like material while being essentially free of bone particles, or essentially free of bone particles larger than bone slivers. Briefly, it has been found in accordance with the present invention that by providing the flite on the auger that rotates at relatively high speed within the cylindrical or cylinder-like perforated screen or housing with a strip of non-abrasive material which engages the inner surface of the screen or perforated housing, and having the non-abrasive strip provided with a cutting edge, the lodged meat fibers caught in the perforations or foramina are cut free and plugging of the perforations and foramina is adequately prevented.

Accordingly, the object of the present invention, generally stated, is the provision of a meat separator machine of the rotary type, such as disclosed in U.S. Pat. No. 4,042,176, which is capable of separating the meat content from an essentially bone-free meat material feed containing a substantial content of sinews or sinew-like material without plugging so as to necessitate frequent shut-down for cleaning and unplugging.

A more specific object of the invention is to provide the relatively high speed conveying auger in a meat separating machine of the type disclosed in U.S. Pat. No. 4,042,176 with a non-abrasive, meat fiber cutting strip in the crest of the auger flite so as to engage the inner surface of the perforated cylinder or screen with a cutting action enhanced by centrifugal force and/or spring action whereby meat fibers that have become caught or lodged in the foramina or perforations are cut loose and the inner surface of the screen or cylinder remains essentially clean and free allowing meat material to extrude through the formina or pores.

Certain other and more specific objects of the invention will be apparent to those skilled in the art from the following detailed description of presently preferred embodiments of the invention.

For a more complete understanding of the nature and scope of the invention, reference may now be had to the following detailed description thereof taken in connection with the accompanying drawings, wherein:

FIG. 2 is a fragmentary, longitudinal sectional view, partly in elevation and on enlarged scale, taken through the perforated housing and screen portion of the machine shown in FIG. 1;

FIG. 3 is a vertical sectional view taken on line 3—3 of FIG. 2;

FIG. 4 is an enlarged fragmentary detail sectional view taken on line 4—4 of FIG. 2;

Figure 1:
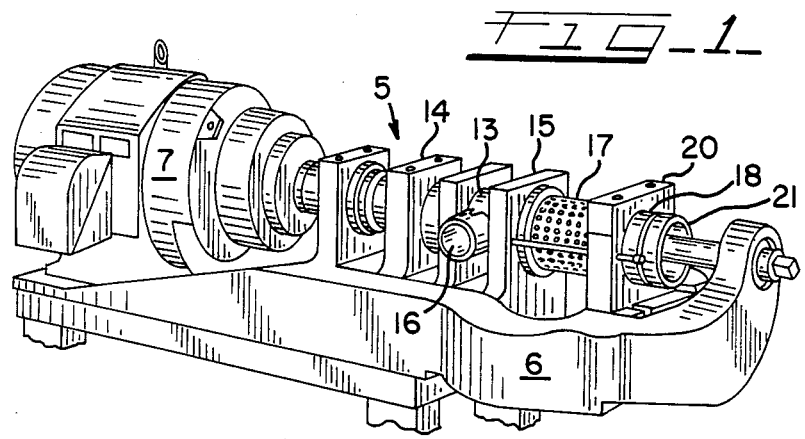
FIG. 1 is a perspective view of the operational portion of a rotary feed-screw meat separating machine in which one embodiment of the present invention is incorporated.

Referring to the drawings, the operational portion of a rotary feed-screw meat separator machine is indicated generally at 5 in FIG. 1 which corresponds essentially to the machine shown in FIG. 1 of the above-mentioned U.S. Pat. No. 4,042,176 except for the improvements therein hereinafter described in connection with FIGS. 2-8. Accordingly, the detailed description of the meat deboning machine 5 contained in U.S. Pat. No. 4,042,176 is incorporated herein by reference and made a part hereof. Briefly, the meat separator machine 5 includes a suitably supported rigid base or frame 6 on which is mounted an electric motor 7 capable of operating at speeds in the range of 500–1800 rpm so as to drive directly an auger having a pressure auger section (44 in U.S. Pat. No. 4,042,176) and a conveying auger section (53 in U.S. Pat. No. 4,042,176), with the feed or pressure section rotating within an imperforate pressure housing 13 (FIG. 1) and the conveying auger section rotating within the perforated housing section 17.

The imperforate cylindrical housing 13 is rigidly supported at its rear and front ends by vertical supports 14 and 15, respectively. Ground or comminuted meat material containing a substantial content of sinews or sinew-like material and being essentially free of bone particles other than bone slivers when present, is introduced into the housing 13 through a side feed connection 16 as described for example in U.S. Pat. No. 4,042,176.

As shown in FIGS. 1 and 2, a foraminous or perforated cylinder 17 is removably supported at its rear infeed end by the front end of the imperforate cylindrical housing 13 and at its front end by the rear end of an internally threaded mounting sleeve 18. The latter is supported by a vertical support 20. In addition to supporting the front end of the foraminous or perforated cylinder 17, which is sometimes referred to as the "screen" because of the small openings or orifices therein, the internally threaded mounting sleeve 18 also supports therein an externally threaded sleeve-like valve member 21.

The manner in which pressure auger section 19 (FIG. 2) is rotatable within the imperforate compression housing 13 and co-axially joined to the rear end of the conveying auger section which is rotatable within the perforated cylinder 17 or screen, is described fully in U.S. Pat. No. 4,042,176. Also described in that patent is the restricted annular discharge orifice 23 that is formed between the beveled surface 24 on the front or discharge end of the conveying auger 22 and the opposing and surrounding inner frusto-conical surface 25 in the rear end of the valve member or sleeve 21.

Taking into consideration practical manufacturing tolerances and the fact that the auger 22 rotates at a speed within the range of 500-1800 rpm, the meat separating machine 5 is designed and made so that there is an appreciable clearance between the outer diameter or crest 26 (FIG. 4) of the flite 27 on the auger 22 and the inner diameter or inner surface 29 (FIG. 2) of the perforated cylinder or screen 17. This clearance may be in the order of 0.030 inch.

As mentioned above (supra, pp. 2,3), when the meat separator machine 5 is conventionally used to separate meat (raw or cooked) from a meat material which contains an appreciable quantity of bone pieces, these bone pieces act to scour the inner surface 29 of the screen or cylinder 17 as the material is conveyed from the inlet end to the outlet orifice 23 thereby keeping the pores or foramina 9 in the screen or housing 17 essentially free to permit the meat to extrude therethrough. Thus, any meat fibers which become lodged in the pores or foramina are cut or severed by the bone particles preventing the clogging of the screen.

In accordance with the present invention, the helical flite 27 of the auger 22 is modified by being provided with a groove 28 (FIG. 4) which may be rectangular in cross-section and into which is removably inserted a non-abrasive wiper strip 30. Preferably, the wiper strip 30 is formed from a wear resistant plastic material with nylon being a preferred material. Preferably, the wiper strip 30 is rectangular in cross-section so that each of its two outer corners can in turn be used as a cutting edge when the strip 30 is properly oriented within the groove 28. In this connection, the wiper strip 30 is preferably so dimensioned with respect to the dimensions of the groove 28 so as to be readily removable and allow not only cleaning of the wiper strip 30 itself but also cleaning of the auger 22 including the flite 27 thereon.

The dimension of the wiper strip 30 in a radial direction should be such that, when the auger 22 is stationary, it lightly engages or nearly engages the interior surface 29 of the perforated screen or cylinder 17. It is not necessary that the wiper strip 30 actually forcibly engage the interior surface 29 when the machine is not operating since the centrifugal force on the wiper strip when the auger 22 is rotating at speeds in excess of 500 rpm will be sufficient to force the wiper strip 30 into adequate engagement with the interior surface 29 of the screen 17 and allow the wiper strip to cut meat fibers or groups of meat fibers that may have become lodged or caught in the foramina or pores 9 in the screen 17.

While the groove 28 in the flite 27 preferably extends from one end of the flite 27 to the other, it is preferred that the opposite ends thereof be closed off after the groove has been machined or formed and such closure may be readily accomplished by a weld-fill. It will be understood that the strip 30 extends from one weld-fill closure to the other.

It has been found that when a meat separator machine of the type shown and described in U.S. Pat. No. 4,042,176 is equipped with a conveying auger corresponding to auger 22 in FIGS. 2-4, the machine may be used to efficiently separate meat from a comminuted or ground meat bearing material which has a substantial content of sinew or sinew-like material (e.g. tendons, gristle, cartilage and connective tissue) with little or no bone content other than bone slivers if present.

Reference may now be had to FIGS. 5-8 for a description of three modifications constituting three different embodiments of the invention as exemplified in the construction shown and described in connection with FIGS. 1-4.

Figure 5:
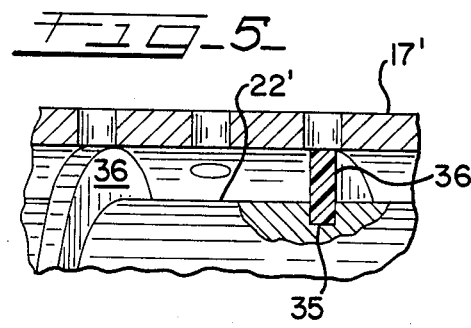
FIG. 5 is a fragmentary view, partly in section and partly in elevation, of a conveying auger incorporating a second embodiment of the invention.

In the modification and embodiment shown in FIG. 5, a conveying auger is indicated at 22' and the perforated housing therefore is indicated generally at 17'. The core of the auger 22 is provided with a spiral groove 35 of rectangular cross-section into which is inserted the root of a flexible strip 36 which constitutes both the flite for the auger as well as the wiper strip. It will be understood that the strip 36 must be of such strength in respect to its physical properties and dimensions so that it does not undergo objectionable deflection during operation. It will also be understood and appreciated that the crest of the strip 36 serves the same function of wiping the interior surface of the screen or perforated cylinder 17 as does the wiper strip 30 in the embodiments of FIGS. 1-4.

Figure 6:
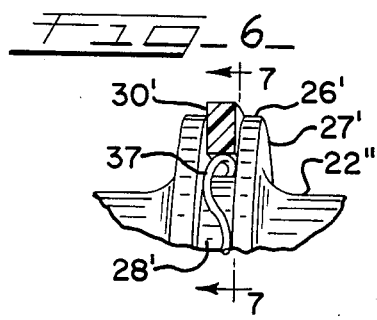
FIG. 6 is a fragmentary view, partly in section and partly in elevation of a conveying auger incorporating a third embodiment of the invention.
Figure 7:
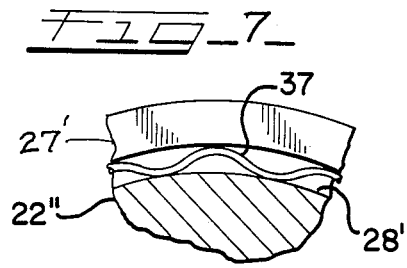
FIG. 7 is a sectional view taken on line 7—7 of FIG. 6.

In FIGS. 6 and 7 an embodiment and modification of the invention is shown which is generally comparable to that of FIGS. 1-4 except that the force with which the wiper strip engages the interior surface of the perforated screen or cylinder is due in part to centrifugal force and in part to spring action. Referring to FIGS. 6 and 7, the conveying auger is indicated therein at 22'' having a helical conveyor flite indicated at 27'. The flite 27' is provided with a groove 28 of rectangular cross-section in which there is disposed a helical spring 37 which includes a series of undulations or waves which are radially compressible so as to exert an expanding force on a wiper strip 30' partially located in the groove and partially projecting radially beyond the crest 26' of the flite 27'.

It will be seen that in operation in a perforated cylinder or screen (e.g. perforated cylinder 17, FIGS. 1-3) the wiper strip 30' will engage the inner interior surface of the screen or cylinder with a force which is in part due to centrifugal force and in part due to the mechanical force provided by the spring 37.

Figure 8:
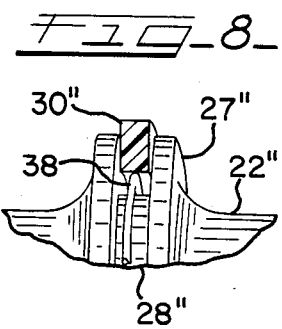
FIG. 8 is a fragmentary view, partly in section and partly in elevation of a conveying auger incorporating a fourth embodiment of the invention.

In FIG. 8, a further modification and embodiment of the invention is shown wherein the auger is indicated generally at 22''' having a flite 27'' provided with a groove 28'' of rectangular cross-section in which is located a coil spring 38 and a wiper strip 30''. In this embodiment, the spring 38 has a resiliency such that it has a normal tendency to expand radially thereby imparting an outwardly expanding force on the wiper strip 30'' so as to augment the force or pressure with which the wiper strip engage the inner surface of the perforated cylinder or screen during operation.

It will be appreciated that certain additional changes and modifications may be made in the foregoing constructions without departing from the spirit and scope of the invention as defined in the appended claims. For example, the embodiment of the invention shown in FIG. 5 can be provided with springs in the helical groove 35 corresponding to the spring 37 of FIGS. 6-7 or spring 38 of FIG. 8. As another example, the wiper strips 30, 30', 30'' and 36 instead of being formed of nylon can be formed of high density polyethylene or ultra high molecular weight polyethylene.

What is claimed is:

1. In a machine for separating meat from feed material containing sinews-like material and being essentially free of bone particles larger than bone slivers and including, a foraminous cylinder having a rear infeed and a front discharge end, a conveying auger co-axially rotatable at relatively high speed within said foraminous cylinder and having a rigid non-yielding flite thereon, and valve means at the discharge end of said auger providing a restricted orifice through which compacted sinews, sinew-like materal and bone slivers discharge, there being a clearance between the outer diameter of said flite and the inside diameter of said foraminous cylinder sufficient to prevent appreciable direct contact between the crest of said flite and the interior surface of said foraminous cylinder, the improvement which comprises at least the radial outermost portion of the auger flite being a wiper strip mounted on the crest of said flite and formed of a material which is non-injurious to the inner surface of said foraminous cylinder when in wiping engagement therewith and said auger is rotating at relatively high speed.

2. The improvement as called for in claim 1 wherein said wiper strip is formed of a plastic material.

3. The improvement as called for in claim 1 wherein said wiper strip is formed of a plastic material selected from the group consisting of nylon, high density polyethylene and ultra high molecular weight polyethylene.

4. The improvement as called for in claim 1 wherein said auger has an integral auger flite and said wiper strip is retained in a groove in the crest of said auger flite.

5. The improvement as called for in claim 4 wherein said wiper strip is movable radially outwardly in said groove due to centrifugal force so as to engage the interior surface of said foraminous cylinder with increased pressure and wiping action.

6. The improvement as called for in claim 4 wherein the opposite ends of said groove are closed off and said wiper strip is removable from and replaceable in said groove.

7. The improvement as claimed for in claim 4 wherein a radially expandable spring is compressed in said groove underneath said wiper strip and presses said wiper strip into engagement with the inner surface of said foraminous cylinder.

* * * * *